UNITED STATES PATENT OFFICE 2,641,596

ORGANIC DERIVATIVES OF TETRAVALENT TIN

William E. Leistner, Brooklyn, and Arthur C. Hecker, Richmond Hill, N. Y., assignors to Argus Chemical Laboratory, Inc., a corporation of New York No Drawing. Application February 7, 1952, Serial No. 270,531

12 Claims. (Cl. 260—98)

The present invention relates to novel organic derivatives of tetravalent tin.

The derivatives according to our invention are derived from tetravalent tin by having at least one valence and at the utmost three valences linked to the sulfur atom of a mercapto-acid ester, while the remaining valence or valences are bound to an organic radical as defined hereinbelow.

The compounds are represented by the type formula $$R_n\text{—}Sn\text{—}X_{4-n}$$

wherein R stands for a radical selected from the group consisting of alkyl, aryl, oxyalkyl, oxyaryl, and furfuryl or tetrahydrofurfuryl radicals, X for an ester of a monobasic mercapto acid having from 2 to 6 carbon atoms, with a monohydric alcohol, and $n$ for an integral number from 1 to 3.

Examples for R are alkyls, such as methyl, ethyl, butyl, octyl, dodecyl, and octadecyl; aryls, such as phenyl, tolyl, or xylyl; oxyalkyls and oxyaryls, such as $C_3H_7O$, $C_4H_9O$, $C_8H_{17}O$, $C_6H_5O$, $C_6H_4(CH_3)O$; $C_6H_3(CH_3)_2O$; and the furfuryl and tetrahydrofurfuryl groups.

Examples for X are esters of thioglycolic acid with n-butyl, sec. butyl, tert. butyl, hexyl, octyl, dodecyl, cetyl acohols, butylcarbitol, benzyl, cyclohexyl, methyl cyclohexyl, tetrahydrofurfuryl and tetrahydroabietyl alcohols.

Instead of the above indicated esters of thioglycolic acid, we may use the esters of thiopropionic, thiobutyric, thiovalerianic or thiocapronic acid. Taking as specific esters, for instance the butyl tin thioglycolic acid, butyl esters, the product may have the following formulae:

$$C_4H_9\text{—}Sn\text{—}(S\text{—}CH_2\cdot COO\cdot C_4H_9)_3$$

or $$(C_4H_9)_2\text{—}Sn\text{—}(S\text{—}CH_2\cdot COO\cdot C_4H_9)_2$$

or $$(C_4H_9)_3\text{—}Sn\text{—}(S\text{—}CH_2\cdot COO\cdot C_4H_9)$$

The novel tin compounds according to our invention are oily liquids of high viscosity, whose composition has in each case been ascertained by analysis.

They are soluble in many organic solvents, for instance in ether, benzene, toluene, chloroform, carbon tetrachloride, or the like.

A general method to prepare these compounds is to prepare first the desired ester of the mercapto acid chosen, and subsequently to react the ester with an organic tin halide, organic tin oxide, or a stannonic acid, containing an organic radical.

The invention will now be illustrated by a number of examples, but it should be understood that these are given by way of illustration and not of limitation and that many variations in the compounds given and the amounts indicated can be made without departing from the spirit of the invention and the scope of the appended claims.

EXAMPLE 1

*Preparation of dibutyl tin dithioglycolic acid cyclohexylester*

$$(C_4H_9)_2\text{—}Sn\text{—}(S\cdot CH_2\cdot COOC_6H_{11})_2$$

92 grams of thioglycolic acid (1 mol) and 100 grams of cyclohexanol (1 mol), to which are added 0.3 gram of para-toluene sulfonic acid and 150 ml. of benzene, are refluxed until the calculated amount of water is eliminated by azeotropic distillation.

124 grams (½ mol) dibutyl tin oxide are then added and the liquid is boiled until the theoretical amount of water has been stripped off, the dibutyl tin oxide having completely dissolved by that time. Slight impurities are filtered off and the benzene is distilled off. The residue is a very viscous liquid of a slightly yellowish color. It is soluble in ether, chloroform, carbon tetrachloride, benzene, toluene, xylene, and other organic solvents.

Analysis:
  Calc. values C=49.8, H=7.6, S=11.1, Sn=20.4
  Found values C=49.5, H=7.7, S=11.3, Sn=19.9

EXAMPLE 2

*Preparation of dibutyl tin dithioglycolic acid tetrahydroabietyl ester*

$$(C_4H_9)_2\text{—}Sn\text{—}S\cdot CH_2\cdot COOC_{20}H_{30})_2$$

In the same way as described in Example 1, we first esterify thioglycolic acid with tetrahydroabietyl alcohol by reacting 287 grams of the alcohol with 92 grams of the acid, adding 0.5 grams para-toluene sulfonic acid in 250 ml. benzene. The reaction with dibutyl tin oxide is then performed as described in Example 1, ½ mol of dibutyl tin oxide being added. The product obtained is very similar to the one described in Example 1, except that its viscosity is much greater.

Analysis:
  Calc. values Sn=12.4, S=6.7
  Found values Sn=12.0, S=6.6

EXAMPLE 3

*Preparation of monobutyl tin tri-beta-thiopropionic acid hexyl ester*

$$C_4H_9—Sn—(S·CH_2·CH_2·COO·C_6H_{13})_3$$

106 grams beta-thiopropionic acid (1 mol) and
102 grams hexyl alcohol (1 mol)
0.3 gram para-toluene sulfonic acid and
150 cc. benzene are reacted as described in Example 1.

To the reaction product we add 70 grams butyl stannonic acid (⅓ mol) which was prepared according to methods described in the literature. The liquid is boiled until the theoretical amount of water has been driven off, the butyl stannonic acid being completely dissolved at that time. Slight impurities are filtered off and the benzene is distilled off. The residue is in appearance and solubility very similar to the product obtained according to Example 1.

Analysis:
  Calc. values Sn=15.9, S=12.9
  Found values Sn=15.65, S=12.6

EXAMPLE 4

*Preparation of dilauryl tin dithiobutyric acid butyl ester*

$$(C_{12}H_{25})_2—Sn—(S·CH_2·CH_2·CH_2·COOC_4H_9)_2$$

8 grams of butyl alcohol, slightly over 1/10 mol, are reacted with 12 grams (1/10 mol) of gammathiobutyric acid in 60 cc. of benzene in the presence of 0.2 gram para-toluene sulfonic acid until the calculated amount of water has been eliminated. To this ester 26 grams (1/20 mol) of dilauryl tin dichloride is added and refluxed for one hour. A current of nitrogen is passed through to eliminate the hydrochloric acid formed in the reaction. Slight impurities are filtered off and the benzene is distilled off. The product is in appearance and properties similar to the one obtained in Example 1.

Analysis:
  Calc. values Sn=14.64, S=7.94
  Found values Sn=14.4, S=7.8

EXAMPLE 5

*Preparation of triphenyl tin thioglycolic acid benzyl ester*

$$(C_6H_5)_3—Sn—S·CH_2COO·CH_2C_6H_5$$

11 grams benzyl alcohol (1/10 mol)
9.2 grams thioglycolic acid (1/10 mol)

are reacted in 60 cc. of benzene in the presence of 0.2 gram para-toluene sulfonic acid in the manner described in Example 1. To the ester obtained in the reaction, we add 43 grams of triphenyl tin bromide (1/10 mol). The liquid is refluxed for one hour. The benzene solution is then washed with water in order to remove the HBr formed in the reaction. Some hydrolysis was caused by the washing operation, materially reducing the yield. After filtering off the impurities and distilling the benzene, we obtain a product which is in appearance and properties similar to the product obtained according to Example 1.

Analysis:
  Calc. values Sn=22.26, S=6.04
  Found values Sn=22.0, S=6.1

The novel compounds made according to the method described above may be used for various purposes. They are excellent stabilizers for halogen containing resins and halogen containing organic compounds. They may also be interesting as such, or as intermediates for pharmaceuticals, or cosmetics. They are effective antioxidants for many fatty oils, resins and rubbers.

In the following, an example will be given for the manufacture of a plastic film in which the compound according to the present invention is used as a stabilizer.

100 parts of Vinylite VYNS, (vinyl chloride and acetate copolymer), and 2 parts of dibutyl tin dithioglycolic acid methylcyclohexanol ester as stabilizer are mixed by tumbling for a period of one hour. The whole mass is then transferred to a Banbury mixer and fused for 10 min. at a temperature of approximately 300° F. It is then dropped and transferred to a warm-up mill, whose roll temperature is likewise maintained at 300° F. The material is then fed as needed to a 3 or 4 roll calender. The roll temperatures of the calender range from 280°–350° F. The vinyl compound is calendered into a film at .004 inch or any other desirable gage.

What we claim is:

1. As a new compound, a product corresponding to the formula $$R_n—Sn—X_{4-n}$$

wherein R stands for a radical selected from the group consisting of alkyl, aryl, oxyalkyl, oxyaryl, furfuryl and tetrahydrofurfuryl radicals, X for an ester of a monobasic mercapto acid having from 2 to 6 carbon atoms with a monohydric alcohol, the sulfur atom being linked to the tin, and n for an integral number from 1 to 3.

2. As a new compound, dibutyl tin dithioglycolic acid cyclohexyl ester.

3. As a new compound, dibutyl tin dithioglycolic acid abietyl ester.

4. As a new compound, monobutyl tin trithiopropionic acid hexyl ester.

5. As a new compound, dilauryl tin dithiobutyric acid butyl ester.

6. As a new compound, triphenyl tin thioglycolic benzyl ester.

7. A process for preparing organic compounds of tetravalent tin of the formula $$R_n—Sn—X_{4-n}$$

wherein R stands for a radical selected from the groups consisting of alkyl, aryl, oxyalkyl, oxyaryl, furfuryl and tetrahydrofurfuryl radicals, X for an ester of a monobasic mercapto acid having from 2 to 6 carbon atoms with a monohydric alcohol, the sulfur atom being linked to the tin and n for an integral number from 1 to 3, which process comprises first preparing the ester of said mercapto acid and reacting it in a diluent at elevated temperatures with a compound selected from the group consisting of organic tin halides, organic tin oxides, and stannonic acid linked to organic substituents as listed for R.

8. A process for preparing dibutyl tin dithioglycolic acid cyclohexylester which comprises first esterifying the thioglycolic acid with cyclohexanol and thereafter reacting the ester with about half a mol of dibutyl tin oxide, removing the diluent and isolating the reaction product.

9. A process of preparing dibutyl tin dithioglycolic acid tetrahydroabietyl ester which comprises first esterifying the thioglycolic acid with tetrahydroabietyl alcohol and thereafter reacting the ester with about half a mol of dibutyl tin oxide, removing the diluent and isolating the reaction product.

10. A process of preparing monobutyl tin tribeta-thiopropionic acid hexyl ester, which comprises preparing first the beta-thiopropionic acid hexyl ester by reacting beta-thiopropionic acid and hexyl alcohol, and thereafter reacting the ester with about one-third of a mol of butyl stannonic acid, removing the diluent and isolating the reaction product.

11. A process of preparing dilauryl tin dithiobutyric acid butyl ester which comprises first preparing the thiobutyric acid butyl ester by reacting thiobutyric acid and butyl alcohol in approximately molar proportions and thereafter reacting the ester with about half a mol of dilauryl tin chloride, eliminating the hydrochloric acid formed in the reaction and isolating the reaction product.

12. A process of preparing triphenyl tin thioglycolic acid benzyl ester which comprises first preparing the thioglycolic acid benzyl ester by reacting thioglycolic acid and benzyl alcohol in approximately molar proportions and thereafter reacting the ester with about one mol of triphenyl tin bromide, eliminating the hydrobromic acid formed in the reaction and isolating the reaction product.

WILLIAM E. LEISTNER.
ARTHUR C. HECKER.

References Cited in the file of this patent

Backer et al.: Recueil Des Travaux Chimique, vol. 53 (1934), pages 1101–1112.